Nov. 1, 1966  J. O. SMITH  3,282,156
ADJUSTABLE MIRROR ASSEMBLY
Filed Feb. 20, 1963
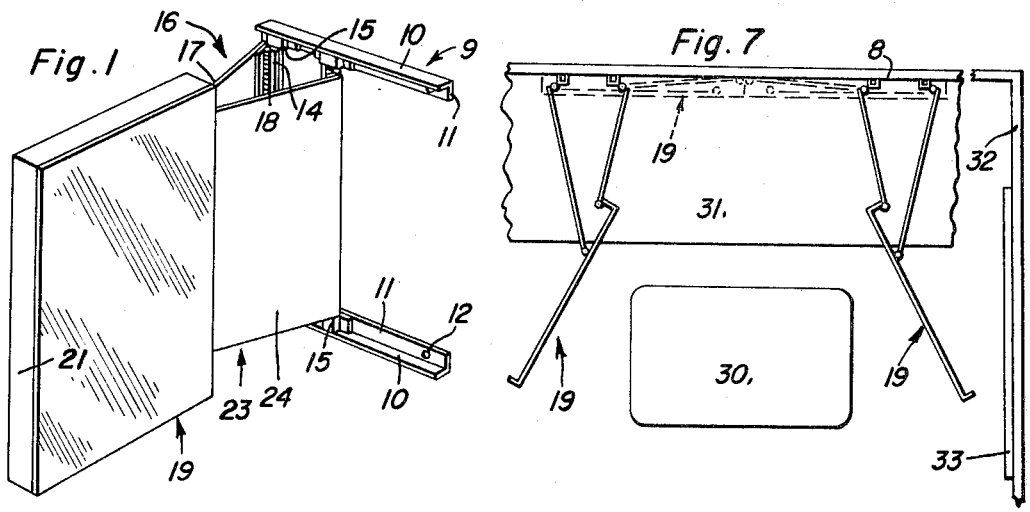
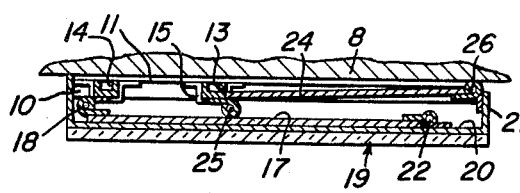
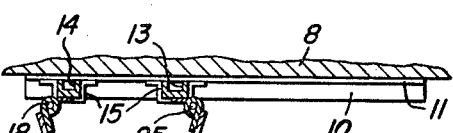
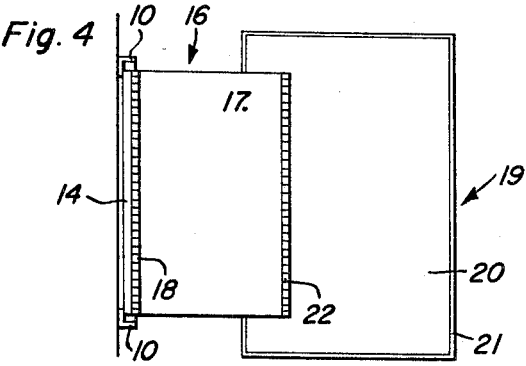
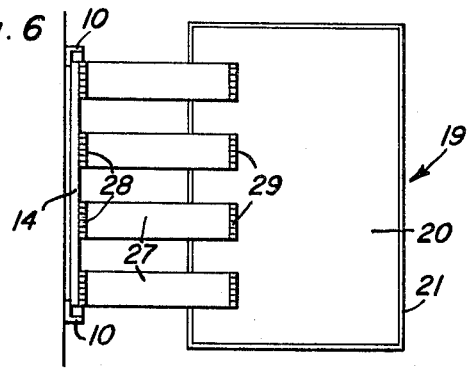
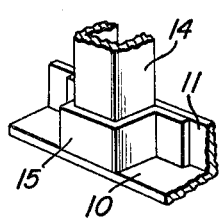
James Oras Smith
INVENTOR.
BY *Clarence A. O'Brien*
*and Harvey B. Jackson*
Attorneys

United States Patent Office 3,282,156
Patented Nov. 1, 1966

3,282,156
ADJUSTABLE MIRROR ASSEMBLY
James Oras Smith, 182 Belmont Drive,
Grand Junction, Colo.
Filed Feb. 20, 1963, Ser. No. 259,809
6 Claims. (Cl. 88—91)

This invention relates generally to new and useful improvements in mirrors to be used singly in conjunction with a conventional dressing mirror or to be used in pairs, with no other mirror necessary, and has for its primary object to provide a foldable mirror which is hingedly mounted for horizontal swinging movement on a wall or other support in a manner to lie substantially flush thereagainst when in an inoperative position, but which when swung away from the support automatically assumes an operative position at right angles to said inoperative position.

Another important object of the present invention is to provide, in a manner as hereinafter set forth, a foldable mount for mirrors of the aforementioned character wherein the mounting or supporting means is substantially concealed from view when the mirror is in a folded or inoperative position.

A further object of the invention is to provide a mirror mount of the character described which embodies simple but unique means for retaining the mirror in inoperative position against the wall or other support.

Other objects are to provide a mirror mount which is comparatively simple in construction, strong, durable, compact, of light weight, attractive in appearance and which may be manufactured at low cost.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is a perspective view showing a mirror mount embodying the present invention in an open or operative position for use in conjunction with a standard dressing mirror or similar oppositely opening mirror mount;

FIGURE 2 is a view in horizontal section through the device, showing the mirror mount in folded or inoperative position;

FIGURE 3 is a view in horizontal section, showing the mirror mount in open or operative position;

FIGURE 4 is a view in rear elevation of the open mirror mount;

FIGURE 5 is an enlarged fragmentary view in perspective of one of the structural details of the mounting means;

FIGURE 6 is a rear elevational view of a modification and;

FIGURE 7 is a diagrammatic view illustrating a mirror unit consisting of two oppositely folding mirror mounts.

Referring now to the drawing in detail, the embodiment of the present invention which has been illustrated in FIGURES 1 to 5, inclusive, of the drawing, comprises a frame unit or structure of suitable metal which is designated generally by reference numeral 9. The frame 9 is mounted on the wall 8 or other support, and includes a pair of vertically spaced, parallel, horizontal metal angle bars 10 having vertical flanges 11 which abut the wall 8 and which are apertured to accommodate fasteners 12 for securing the bars 10 on the wall. Extending vertically between the angle bars 10 are spaced, parallel inner and outer channel bars 13 and 14, respectively. It will be noted that the bar 14 is located adjacent to one end of the bars 10. Straps or loops 15 secure the end portions of the bars 13 and 14 to the flanges 11 of the bars 10.

An arm or bracket 16 in the form of a rectangular plate 17 is secured by a piano hinge 18 for swinging movement in a horizontal plane on the bar 14. Hingedly mounted for horizontal oscillation on the outer or free end of the arm 16 is a mirror 19. The mirror 19 includes a backing plate or panel 20 having formed integrally therewith a right angularly extending marginal flange 21. A piano hinge 22 pivotally connects the arm 17 to the backing plate 20 of the mirror 19. It will be noted that the hinge 22 is affixed to the backing plate 20 at a point adjacent to but spaced from one of the vertical edges of the mirror. This is shown to advantage in FIGURE 3 of the drawing.

A relatively short bracket or arm 23 comprising a plate 24 is secured for horizontal swinging movement on the bar 13 by a piano hinge 25. The free end of the arm 23 is secured by a piano hinge 26 to the flange 21 of the mirror unit 19 which is adjacent the hinge 22.

It is thought that the manner of use of the mirror and folding mount therefor will be readily apparent from a consideration of the foregoing. Briefly, and with reference to FIGURE 7, two of the mirrors of the present invention are preferably used as a unit, these mirrors being mounted side by side with the adjoining edges substantially abutting each other, one mount unfolding to the right and the other to the left so as to position the mirrors in facing relation to each other. As will be appreciated, such an arrangement allows the user thereof, for example seated on a bench 30 in front of a dressing table 31, to, by looking in one mirror, obtain a clear view of the rear and sides of the head in an obvious manner. The mirrors of course can be of any desired height and used for a variety of tasks such as dress fittings.

Rather than using two foldably mounted mirrors as a unit as described supra, a single foldably mounted mirror can be used in conjunction with a conventional mirror, the mirrors being mounted on different right-angularly related walls adjacent a corner of a room. That is, if the left-hand mirror mount in FIGURE 7 were positioned adjacent the corner of a room formed by walls 8 and 32, the right-hand mirror mount could be eliminated and a conventional mirror 33 fixedly mounted on wall 32 substituted therefor.

In operation, when the mirror 19 is swung toward the wall 8 on the arm 17, the relatively short arm 23, in addition to assisting in supporting said mirror, swings same to a position paralleling the wall 8 against which said mirror comes to rest. When in the inoperative position of FIGURE 2 of the drawing the mirror 19 encloses and substantially conceals the mounting means including the members 10, 13, 14, 16, 23, etc., with the marginal flange 21 touching the support wall on all sides except the side to which the hinge 26 is secured, thus allowing for an unencumbered working of this hinge 26. Further, when the mirror 19 is returned to the position of FIGURE 2 of the drawing the arm 23 swings past dead center for securing said mirror in the inoperative position against the wall. Of course, the mirror 19 may be used as such in either position and in intermediate positions. Further, when used in conjunction with a second mirror in the position indicated in phantom lines in FIGURE 7 of the drawing the mirrors 19 are closely adjacent each other and may function as a single large mirror.

In the modification of FIGURE 6 of the drawing, reference numeral 27 designates a series of spaced, parallel arms which may be substituted for the arm 16. The arms 27 having one end hingedly secured at 28 to the bar 14. The other or free ends of the arms 27 are hingedly secured at 29 to the backing plate 20 of the mirror unit 19. Similar spaced, parallel arms are substituted for the arm 23. In other respects this form of the invention is substantially similar in construction and operation to the embodiment of FIGURE 1 of the drawing.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An adjustable mirror assembly comprising a supporting structure, a planar mirror positionable in overlying parallel relation to said structure, said mirror having first and second edges, a face and a back, a first mirror mounting arm having opposed ends, means hingedly securing a first end of the first arm to the structure at a fixed location for movement of said first arm from a first position paralleling said structure to a second position projecting outwardly therefrom, a means hingedly securing the second end of said first arm to the back of said mirror at a fixed location with respect to the mirror for outward movement of said mirror upon an outward movement of said first arm, a second mirror mounting arm longer than said first arm, said second arm having first and second ends, means hingedly securing the first end of the second arm to the supporting structure at a fixed location spaced from the first end of the first arm for movement of said second arm from a first position paralleling said structure and overlying the first arm in its first position to a second position projecting outwardly therefrom, and means hingedly securing the second end of said second arm to the back of said mirror at a fixed location with respect to the mirror closer toward the second edge of said mirror than the second end of said first arm for effecting, in conjunction with said first arm, a movement of the mirror from a position paralleling the structure to a position generally perpendicular thereto as the two arms are swung outwardly.

2. The assembly of claim 1 wherein the second end of said first arm is secured to the back of the mirror adjacent the first edge thereof for movement of said first edge away from a position juxtaposed said structure to a position outwardly spaced therefrom a distance substantially equal to the length of said first arm upon an outward swinging of said first arm.

3. The assembly of claim 2 wherein, when the mirror is in a position paralleling and overlying the supporting structure, the means hingedly fixing the second end of the first arm to the back of the mirror is located closer to the structure than the means hingedly fixing the first end of the first arm to the structure thereby requiring a movement of the second end of the first arm past dead center when moving said mirror into its structure paralleling position for releasably securing the mirror in this position.

4. The assembly of claim 3 wherein the width of the mirror between the second end of the second arm and the second edge thereof is greater than the length of said second arm so as to completely conceal said second arm when paralleling said supporting structure.

5. The assembly of claim 4 wherein the first ends of the arms are secured to the supporting structure in substantially a common plane paralleling the structure, each of said arms being rigid throughout the length thereof.

6. The assembly of claim 1 wherein, when the mirror is in a position paralleling and overlying the supporting structure, the means hingedly fixing the second end of the first arm to the back of the mirror is located closer to the structure than the means hingedly fixing the first end of the first arm to the structure thereby requiring a movement of the second end of the first arm past dead center when moving said mirror into its structure paralleling position for releasably securing the mirror in this position.

References Cited by the Examiner
UNITED STATES PATENTS
2,746,829   5/1956   Spillane _____ 88—85 X JEWELL H. PEDERSEN, *Primary Examiner.*

DAVID H. RUBIN, *Examiner.*

W. L. SIKES, *Assistant Examiner.*